(12) United States Patent
Farrell et al.

(10) Patent No.: US 8,219,902 B2
(45) Date of Patent: Jul. 10, 2012

(54) SYSTEM AND METHOD FOR REMOTE UPDATE OF DISPLAY PAGES

(75) Inventors: Jason Farrell, Bellevue, WA (US);
Ashley Glennon, Bellevue, WA (US);
Erik Rogneby, Bellevue, WA (US);
Ezinne Oji Udezue, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 830 days.

(21) Appl. No.: 12/165,431

(22) Filed: Jun. 30, 2008

(65) Prior Publication Data
US 2009/0150764 A1 Jun. 11, 2009

Related U.S. Application Data

(63) Continuation of application No. 11/925,588, filed on Oct. 26, 2007, now abandoned.

(51) Int. Cl.
*G06F 17/00* (2006.01)
*G06F 15/16* (2006.01)

(52) U.S. Cl. ........ 715/234; 715/203; 715/751; 715/769; 709/203; 709/219; 713/166; 713/176

(58) Field of Classification Search .......... 715/200–205, 715/234, 241, 242, 249, 254, 255, 256, 259, 715/741–743, 760; 713/1, 161, 166, 170, 713/176, 182, 375, 400, FOR. 400; 709/201, 709/202, 203, 204, 206, 207, 217, 218, 219, 709/223
See application file for complete search history.

(56) References Cited

U.S. PATENT DOCUMENTS

| | | | | |
|---|---|---|---|---|
| 7,032,003 | B1 * | 4/2006 | Shi et al. | 709/203 |
| 7,203,505 | B1 * | 4/2007 | Larikka et al. | 455/466 |
| 7,584,225 | B2 * | 9/2009 | Jiang et al. | 1/1 |
| 7,668,535 | B2 * | 2/2010 | Conneely et al. | 455/412.2 |
| 7,770,226 | B2 * | 8/2010 | Ahn | 726/26 |
| 2005/0138082 | A1 * | 6/2005 | Rauma et al. | 707/200 |
| 2006/0277598 | A1 * | 12/2006 | Ahn | 726/5 |
| 2007/0143357 | A1 * | 6/2007 | Chaudhri | 707/201 |

* cited by examiner

*Primary Examiner* — Maikhanh Nguyen
(74) *Attorney, Agent, or Firm* — Kenyon & Kenyon LLP

(57) ABSTRACT

A system and method may include a device, e.g., a cellular telephone, and a server providing for remotely updating display pages of the device. The server may: provide for display of a webpage including a first section having a visual replication of a display page of the device and a second section including a plurality of graphical objects, the webpage including interactive functionality for modification of the visual replication in response to a drag-and-drop operation of one of the plurality of graphical objects to a position in the visual replication; and, responsive to receipt of an instruction to permanently set the modification, transmit a synchronization message to the device indicating an association of the one of the plurality of graphical objects with the position. In accordance with the synchronization message, the device may update a data store used by the device for generating the display page.

24 Claims, 5 Drawing Sheets

SYSTEM AND METHOD FOR REMOTE UPDATE OF DISPLAY PAGES

CROSS-REFERENCE TO RELATED APPLICATIONS

The present application is a continuation of U.S. patent application Ser. No. 11/925,588, which was filed in the U.S. Patent Office on Oct. 26, 2007 now abandoned, and which is expressly incorporated herein in its entirety by reference thereto.

BACKGROUND

Service providers for devices, e.g., handheld devices such as cellular devices, often maintain websites which service users may access to manage and/or view information pertaining to the users' accounts. However, the extent to which a user can control the device at which the service is provided via such a website is limited.

It is desirable to expand integration of the device and website since it is often easier to manage data and visual objects on devices, other than the devices at which the service is provided, via which access may be provided to the websites. For example, cellular telephones often have less processing power and are generally smaller than personal computers (PCs), so that viewing and manipulating data and objects on the cellular telephones is more difficult and less efficient than via a PC.

A conventional handheld device such as a cellular telephone may include applications which may be executed on the device for manipulation of or interaction with graphical objects, such as icons, in response to user input at the device. The graphical object manipulation or interaction can include, e.g., selection of an object, the selection interpreted as an instruction to perform an action, placement of the object in a particular position on a display screen, and/or a purchase order of a graphical object to be transmitted to the device.

It is desirable to provide, in an efficient and easy-to-use manner, functionality to manipulate and interact with graphical objects of or for the device at which the service is provided at a device remote from the device at which the service is provided.

SUMMARY

Embodiments of the present invention allow a service provider to offer handheld device users a web-based and user-friendly interface for updating their handheld devices. A server (operated by the service provider) may provide data storage for current data and settings, as well as archived data and additional content from either the service provider or a third party. The server may provide any terminal capable of viewing webpages and connected to the same network (e.g., the Internet) with an update interface where the users may enter changes that are then synchronized with their handheld device. Synchronization may occur in real-time or upon some event trigger, such as clicking "save changes" or "place order." Synchronization may be implemented by sending SMS and MMS messages between the server and the handheld device.

In an example embodiment, the service provider may be a cellular service provider and the handheld devices may be cellular phones, personal digital assistants, and/or other wireless communication devices. The devices may include a plurality of contacts records and a graphical icons, e.g., for representing respective contacts records in a display page. In an example embodiment, a predetermined number, e.g., five, of the contacts records or portions thereof may be selected as a subset to be represented on a display page. For example, the subset may include contacts records having information regarding contacts with whom the user most often communicates or otherwise considered as "favorites" of the user. For example, the subset may correspond to those contacts records or communication path information, e.g., phone number(s), of those contacts records for which prices for communication with the handheld device differs from prices applied to other contacts records or portions thereof. These favorites may be presented in the display page of a graphical user interface of the handheld device in an order the user sets. Aside from storage at the handheld device, the contacts records and/or favorites identifications may be stored at the server.

The server may provide a webpage including a representation of the display page provided at the handheld device to any terminal with a web browser. Additionally, the webpage may include a representation of a vault including a plurality of graphical icons which may be selected for association with the contacts records. The webpage may include functionality for the user to drag and drop icons from the vault representation to the display page representation to change the association between the positions in the display page representing the subset of the contacts records and the graphical objects placed in the positions on the display page. The server may perform a synchronization operation to update the display page of the handheld device to conform to the updates made to the display page representation. Any changes made at the handheld device, e.g., via a local program of the handheld device, may also be synchronized back to the server.

An example embodiment of the present invention may provide a system for updating display pages of a handheld device. The system may include: a first server configured to maintain a website; a first device configured to access the first server; and a second device configured to display a display page having a set of defined positions. In response to the access by the first device, the first server may transmit to the first device a webpage including a first section having a representation of the display page that visually appears as at least a portion of the display page including the set of defined positions and a second section having a plurality of graphical objects. The first device may: display the webpage; receive user input interpreted as an interaction with the webpage to update the display page representation to include at one of the defined positions a selected one of the graphical objects; and transmit to the first server data indicating that the update is to be applied to the display page. Responsive to receipt of the data transmitted to the first server, the first server may: update a positions-objects association, e.g., a table, such that the updated positions-objects association associates the one of the defined positions with the selected graphical object; and transmit a synchronization message to the second device identifying the association of the one of the defined positions with the selected graphical object. The second device may display, in accordance with the synchronization message, an updated version of the display page including the selected graphical object at the one of the defined positions.

In an example variant of this embodiment, the plurality of graphical objects of the second portion may include graphical objects offered for sale by a content provider. Responsive to receipt of the data transmitted to the first server, the first server may send a purchase request to the content provider for the selected graphical object. The first server may receive a copy of the selected graphical object from the content provider.

The copy may be sent by the content provider without Digital Rights Management (DRM) protection to the first server, the first server may modify the copy to include the DRM protection, and the identification of the association of the one of the defined positions with the selected graphical object in the synchronization message may include the modified copy.

In another example variant of this embodiment, which may be implemented with or separate from the previously described variant, the data may be transmitted to the first server in response to a user input instruction to update the display page to appear as the updated display page representation.

In another example variant of this embodiment, which may be implemented with or separate from one or both of the previously described variants, the synchronization message may include at least one of a Short Messaging Service (SMS) and a Multimedia Messaging service (MMS) message.

The second device may store a first MMS profile and a second MMS profile. The synchronization message may include an MMS message that is in accordance with the second MMS profile. The second device may output an alert responsive to receipt of a message that is in accordance with the first MMS profile and not in response to receipt of any message that is in accordance with the second MMS profile. The display of the updated version of the display page by the second device may occur without any user interaction with the second device.

In another example variant of this embodiment, which may be implemented with or separate from some or all of the previously described variants, each of the set of defined positions may be reserved for association with a corresponding contacts record. The display page of the second device may include functionality such that responsive to selection of the selected graphical object in the one of the defined positions of the updated version of the display page, the second device may display the contacts record corresponding to the one of the defined positions or initiate a communication in accordance with at least one communication listing of the corresponding contacts record.

In another example variant of this embodiment, which may be implemented with or separate from some or all of the previously described variants, responsive to user input entered at the second device for updating the display page to include at the one of the defined positions a second graphical object, the second device may transmit a synchronization message to the first server identifying the association of the one of the defined positions with the second graphical object. Responsive to receipt of the synchronization message transmitted by the second device, the first server may update a positions-objects association.

Updating the display page to include at the one of the defined positions the second graphical object may include the second device transmitting a request to a content provider to purchase the second graphical object. Responsive to the request, the content provider may transmit a version of the second graphical object having Digital Rights Management (DRM) protection to the second device and a version of the second graphical object without the DRM protection to the first server. The identification of the association of the one of the defined positions with the second graphical object may identify the version of the second graphical object transmitted by the content provider to the first server.

In another example variant of this embodiment, which may be implemented with or separate from some or all of the previously described variants, the interaction may include a drag-and-drop operation of the selected graphical object from the second section to the one of the defined positions in the first section.

In another example variant of this embodiment, which may be implemented with or separate from some or all of the previously described variants, the second device may be a cellular telephone.

In another example variant of this embodiment, which may be implemented with or separate from some or all of the previously described variants, the first server and the website may be maintained by a provider of cellular service to the cellular telephone.

In another example variant of this embodiment, which may be implemented with or separate from some or all of the previously described variants, the plurality of graphical objects of the second portion may include graphical objects offered for sale. Responsive to receipt of the data transmitted to the first server, the first server may: send a copy of the selected graphical object without Digital Rights Management (DRM) protection to a second server; and generate a copy of the selected graphical object including the DRM protection. The synchronization message may include the copy including the DRM protection.

An example method of the present invention, for updating display pages of a handheld device, may include, responsive to access of a first server by a first device, the first server transmitting to the first device a webpage. The webpage may includes a first section having a representation of a display page that a second device is configured to display. The display page that the second device is configured to display may have a set of defined positions. The webpage may also include a second section having a plurality of graphical objects. The representation of the display page may visually appear as at least a portion of the display page including the set of defined positions. The method may further include the first device: displaying the webpage; receiving user input interpreted as an interaction with the webpage to update the display page representation to include at one of the defined positions a selected one of the graphical objects; and transmitting to the first server data indicating that the update is to be applied to the display page. The method may further include, responsive to receipt of the data transmitted to the first server, the first server: updating a positions-objects association such that the updated positions-objects association associates the one of the defined positions with the selected graphical object; and transmitting a synchronization message to the second device identifying the association of the one of the defined positions with the selected graphical object. The method may further include the second device displaying, in accordance with the synchronization message, an updated version of the display page including the selected graphical object at the one of the defined positions.

In an example variant of the method, the plurality of graphical objects of the second portion may include graphical objects offered for sale by a content provider and the method may further include: responsive to receipt of the data transmitted to the first server, the first server sending a purchase request to the content provider for the selected graphical object; and the first server receiving a copy of the selected graphical object from the content provider.

The copy may be sent by the content provider without Digital Rights Management (DRM) protection to the first server and the method may further include: the first server modifying the copy to include the DRM protection. The association of the one of the defined positions with the selected graphical object in the synchronization message may include the modified copy.

In another example variant of the method, which may be implemented with or separate from the previously described variant, the data may be transmitted to the first server in response to a user input instruction to update the display page to appear as the updated display page representation.

In another example variant of the method, which may be implemented with or separate from one or both of the previously described variants, the synchronization message includes at least one of a Short Messaging Service (SMS) and a Multimedia Messaging service (MMS) message.

The method may further include the second device: storing a first MMS profile and a second MMS profile, the synchronization message including an MMS message that is in accordance with the second MMS profile; and outputting an alert responsive to receipt of a message that is in accordance with the first MMS profile and not in response to receipt of any message that is in accordance with the second MMS profile.

In another example variant of the method, which may be implemented with or separate from some or all of the previously described variants, each of the set of defined positions may be reserved for association with a corresponding contacts record, and the display page of the second device may include functionality such that responsive to selection of the selected graphical object in the one of the defined positions of the updated version of the display page, the second device displays the contacts record corresponding to the one of the defined positions or initiates a communication in accordance with at least one communication listing of the corresponding contacts record.

In another example variant of the method, which may be implemented with or separate from some or all of the previously described variants, the method may further include: responsive to user input entered at the second device for updating the display page to include at the one of the defined positions a second graphical object, the second device transmitting a synchronization message to the first server identifying the association of the one of the defined positions with the second graphical object; and responsive to receipt of the synchronization message transmitted by the second device, the first server updating a positions-objects association.

The method may further include: responsive to the user input entered at the second device for updating the display page, the second device transmitting a request to a content provider to purchase the second graphical object; the second device receiving from the content provider a version of the second graphical object having Digital Rights Management (DRM) protection and that was transmitted to the second device by the content provider in response to the request; and the first server receiving from the content provider a version of the second graphical object without the DRM protection that was transmitted to the first server by the content provider in response to the request. The identification of the association of the one of the defined positions with the second graphical object of the synchronization message transmitted by the second device may identify the version of the second graphical object received by the first server from the content provider.

In another example variant of the method, which may be implemented with or separate from some or all of the previously described variants, the interaction may include a drag-and-drop operation of the selected graphical object from the second section to the one of the defined positions in the first section.

An example display page modification method of the present invention may include providing a webpage including a first section having a visual replication of at least a portion of a display page of a device and a second section including a plurality of graphical objects. The webpage may include interactive functionality for modification of the visual replication in response to a drag-and-drop operation of one of the plurality of graphical objects to a position in the visual replication. The method may further include, responsive to receipt of an instruction to permanently set the modification, transmitting a synchronization message to the device indicating an association of the one of the plurality of graphical objects with the position.

An example embodiment of the present invention may provide a hardware-implemented computer-readable medium having stored thereon instructions adapted to be executed by a processor, the instructions which, when executed, cause the processor to perform a display page modification method. The display page modification method may include: providing a webpage including a first section having a visual replication of at least a portion of a display page of a device and a second section including a plurality of graphical objects, the webpage including interactive functionality for modification of the visual replication in response to a drag-and-drop operation of one of the plurality of graphical objects to a position in the visual replication; and responsive to receipt of an instruction to permanently set the modification, transmitting a synchronization message to the device indicating an association of the one of the plurality of graphical objects with the position.

DETAILED DESCRIPTION

Figure 1:
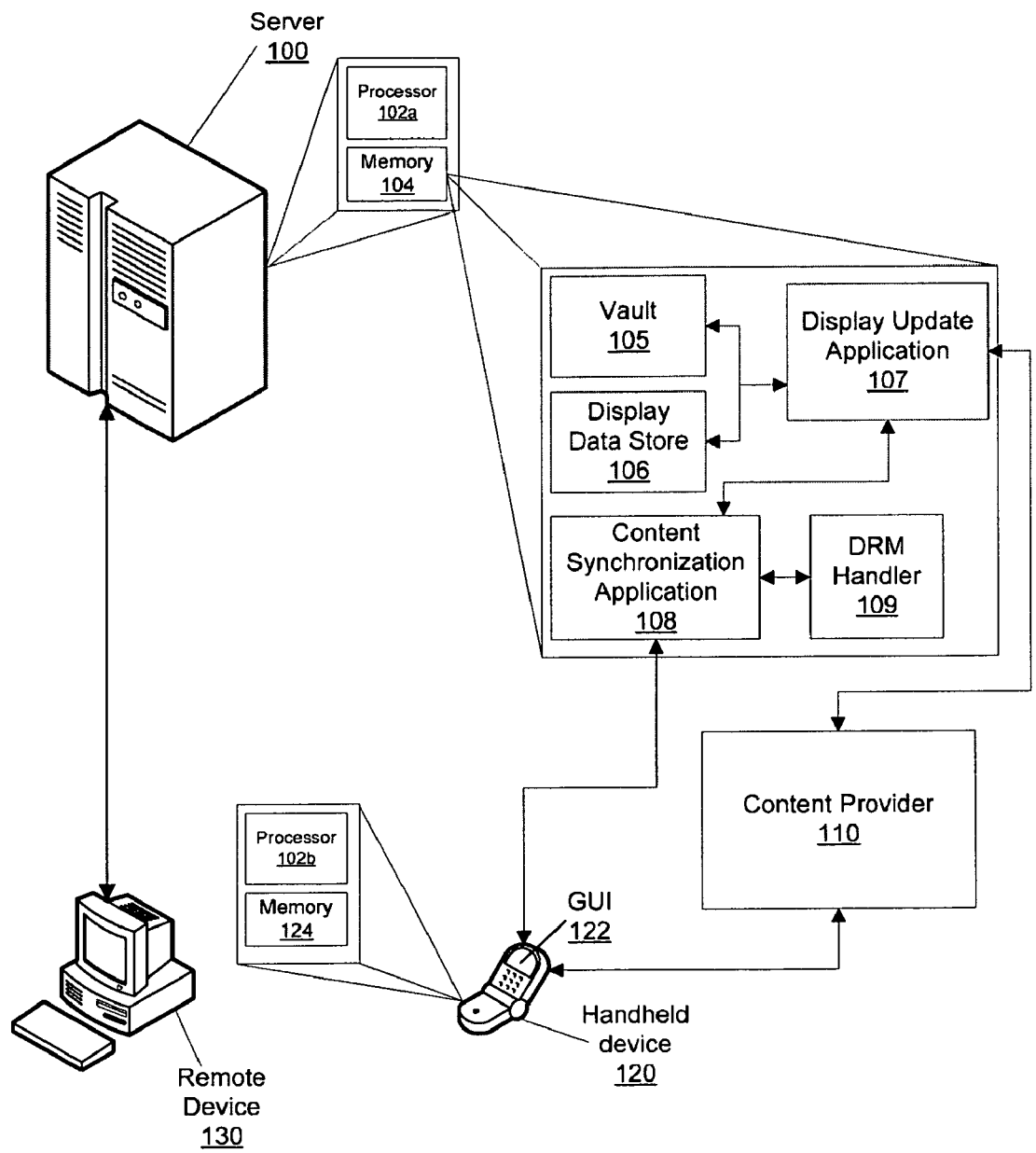
FIG. 1 is a block diagram that illustrates components of a system according to an example embodiment of the present invention.

FIG. 1 shows a system according to an example embodiment of the present invention. The system may include a server 100 including a processor 102a and a memory 104. The processor 102a may execute application instructions stored, for example, in the memory 104. The execution of the application instructions may include processing of data stored in the memory 104 and communicating with a content provider 110, handheld device 120, and/or remote device 130.

The memory 104 may include, for example, any conventional hardware implemented memory device and may store, for example, a graphical object vault 105, a display data store 106, a display update application 107, a content synchronization application 108, and a Digital Rights Management (DRM) handler 109.

The vault 105 and display data store 106 may include data associated with a user account of a service, e.g., wireless telephone service, provided via the handheld device 120. The handheld device 120 may include hardware and/or software that provides for wireless communications between the handheld device 120 and other devices. The handheld device 120 may be embodied as, for example, a cellular telephone or a personal digital assistant (PDA).

The vault 105 may include a collection of graphical objects, e.g., icons. The icons may include, for example, ones the user has instructed the server to place in the vault 105, ones previously purchased from the content provider 110, and/or ones previously or currently set at positions provided in a Graphical User Interface (GUI) 122 of a display of the handheld device 120, e.g., where the icons set in the positions of the GUI 122 may be provided with functionality such as selectability interpreted as instruction input. The icon positioning may include, for example, placement of icons in positions associated with records of a contacts database, where each record includes information regarding a single corresponding contact. Examples of such information include but are not limited to, a name, one or more telephone numbers, a fax number, a home address, a blog site, and an e-mail address. The handheld device 120 may be programmed to interpret selection by a user via an input device of the handheld device 120, e.g., a keyboard, of one of the icons in a position associated with a corresponding contacts record as an instruction to perform an action related to the corresponding contacts record. For example, in response to selection of the icon, the handheld device 120 may, e.g., display in the GUI 122 stored information about the contact, e.g., the contacts record, or may initiate a communication session in accordance with a communication listing of the contacts record, e.g., place a call to one of the listed telephone numbers or send an e-mail message to one of the listed e-mail addresses of the contacts record.

The display data store 106 may include data indicating user preferences of the user account regarding one or more display pages to be provided via the GUI 122 of the handheld device 120. The user preferences may include preferences regarding the positioning of icons, e.g., copies of which may be stored in the vault 105, on the one or more display pages. It is noted that some or all of the data of the display data store 106 may be stored in one or more servers other than the server 100, which provides the website.

The data store 106 or parts thereof may also be stored in a memory 124 of the handheld device 120 so that the display pages may be generated at the handheld device 120 without a connection to the server 100.

The display update application 107 may include instructions for execution by the processor 102*a* for generating a webpage of a website via which a user may access the data of the vault 105 and the display data store 106 using any device running a web browser, e.g., the remote device 130, which may be connected to the server 100 via a network such as the Internet. It is noted that the handheld device 120 itself may similarly access the webpage if it runs a web browser. The processor 102*a*, when executing instructions of the display update application 107, may update the data of the vault 105 and/or the display data store 106. It will be appreciated that the instructions of the display update application 107 and/or the content synchronization 108 may be executed by the processor 102*a* of the server 100 or by a processor of the remote device 130 accessing the website provided by the server 100. Similarly, some of the instructions may be executed at the server 100 and others may be executed at the remote device 130. For example, instructions using the DRM Handler 109 (described below) may be executed at the server 100, while other instructions for modifying the webpage appearance may be executed at the remote device 130. Which processor executes instructions may depend on the architecture and topology used to implement the invention.

Figure 2:
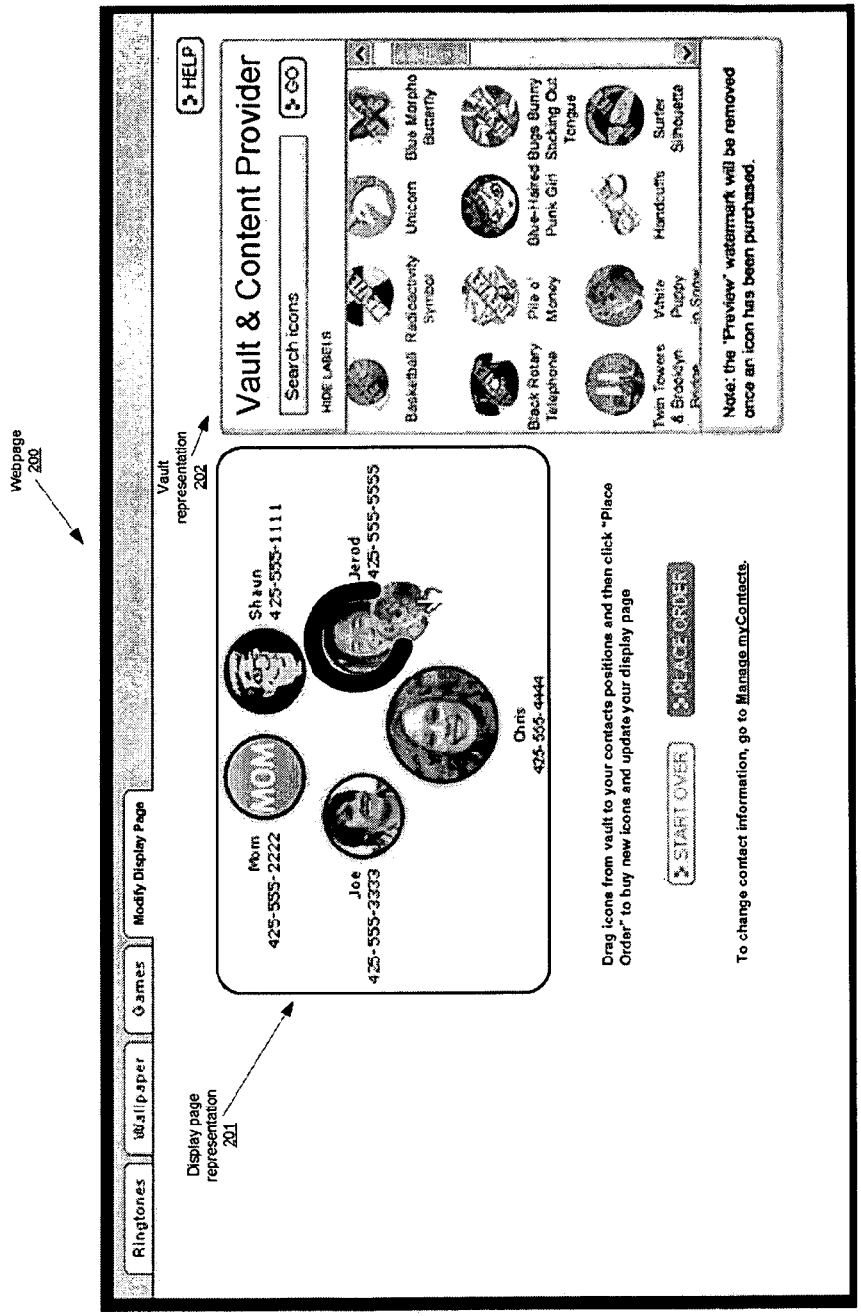
FIG. 2 is a diagram illustrating a display screen and a table associated with a display of a part of the display screen, according to an example embodiment of the present invention.

The generated webpage may include graphical representations of the contents of the vault 105 and one or more display pages that may be generated at the handheld device 120 (e.g., via local non-web programs of the handheld device 120) in accordance with the display data store 106. For example, FIG. 2 shows a webpage 200 including a display page representation 201 and a vault representation 202. While the graphical elements in the display pages generated at the handheld device may be provided with apparent functionality, such that the processor 102*b* of the handheld device 120 may perform an action in response to selection of the graphical elements, the representations of the display pages in the webpages of the website provided by the server 100, which may visually appear approximately or exactly as the display pages or portions thereof, may include the same graphical elements as the display pages but without such functionality. For example, the display pages and the display page representations may look alike, but an icon of the display page, selection of which may cause the processor 102*b* to perform an action, may be represented by a corresponding icon in the display page representation without such functionality. Functionality may include placing a call to a number listed in a contacts record associated with the icon from the handheld device 120 or displaying data of the contacts record on the GUI 122. The display of the display page representation(s) at the remote device 130 at which the webpage is accessed may be for allowing the user to interact with the webpage to update the corresponding display page of the handheld device 120.

In an alternative example embodiment, some of the functionality provided via the display page may also be provided with the display page representation via which the display page may be updated or with another representation of the web page. For example, functionality for responsively displaying a contacts record may also be provided via the webpage.

The display update application 107 may include instructions for execution by a processor that allows a user to change one or more display pages of the handheld device 120 in response to interaction with the display page representations of the webpage and/or the graphical objects of the vault 105. Alternatively, the display update application 107 may generate the webpage with code that allows the processor of the remote device 130 to perform the modification. For example, the display update application 107 may provide for a drag-and-drop functionality associated with pre-determined user input via an input device, e.g., a computer mouse, applied to locations within the webpage that correspond to the graphical objects of the vault 105 and objects or positions within the display page representations of the webpage. The user input may be, for example, a combination of a mouse click, a mouse movement, and a mouse release. The user may select an object from within the vault representation 202, drag the object via movement of the mouse to a position within the display page representation 201, and drop the object at the position.

Responsive to the user input, the processor may graphically represent the drag-and-drop operation. The selected graphical object may be shown moving from the vault representation 202 together with a mouse pointer to the position on the display page representation 201 at which the user drops the graphical object, e.g., as shown in FIG. 2. In an example embodiment of the present invention, when the user moves a graphical object from the vault representation 202 into a vicinity of a listed position of the display page representation 201, the processor may highlight the position, as shown in FIG. 2, to inform the user that a drop of the graphical object would place the object into the highlighted position.

As described above, some positions within the display pages displayed at the handheld device 120 and for which representations may be provided via the webpage may be associated or reserved for association with contacts records.

A contacts record may include information such as one or more phone numbers, name, address, or any other data of a contact. The contacts records with which the positions of the display page may be associated may be a subset of a greater collection of contacts records of the display data store 106. For example, the subset may be those for which speed dial numbers have been assigned at the handheld device 120 or may be part of a "favorites" list. In an example embodiment of the present invention, the display data store 106 (and a corresponding data store of the handheld device 120) may include a list of the positions of a display page that are reserved for association with contacts records and an identification of the association of each of the positions with a corresponding contacts record if such an association has been made. For example, referring to FIG. 2, the top right circle of the display page representation 201 may be listed as position 1 of a table 203 of the display data store 106 and may be associated with an identification of a contacts record for "Shaun." It is noted that the location on the display page of a listed position need not be fixed. For example, a program of the handheld device 120 and/or of the website may provide for rotation of the positions in the display page and/or the display page representation in a clockwise or counter-clockwise direction. Regardless of the rotation, the list of the table 203 may be left unchanged. The table 203 may further associate the position (and the contacts record) with a graphical objects called "icon 1." The table 203 may further list the other positions shown as circles in the display page representation 201 and their associated contacts records and graphical objects. If a position has not yet been associated with a contacts record, column 2 of the table 203 may be unpopulated at the row corresponding to the unassociated position. Similarly, if a position has not yet been associated with a graphical object, column 3 of the table 203 may be unpopulated or may include a pointer to a default object at the row corresponding to the unassociated position.

In response to the drag-and-drop operation, the display update application 107 may update the table 203 when the server 100 receives the update from the remote device 130. For example, if the user drops an icon retrieved from the display of the vault 105 onto a position display page representation, the display update application 107 may update the table 203 to include at the row corresponding to the position onto which the icon was dropped a pointer to a file having the dropped icon. In an example embodiment of the present invention, the display update application 107 (or the processor of the remote device 130) may maintain a copy of the table 203 to which the changes are initially applied in response to the drag-and-drop operation. After further user input instructing the display update application 107 to fix the changes is received, e.g., via selection by the user of a graphical button stating "apply changes," the display update application 107 may enter corresponding changes to the table 203 of the display data store 106.

In an example embodiment of the present invention, the display update application 107 may provide for exchanging graphical objects between positions of the display page representation. For example, in response to a drag and drop of an icon shown at a first position to a second position, the processor (of the server 100 or the remote device 130) may display at the first position the icon previously shown at the second position, if any. In an example embodiment, the contacts records associated with the first and second positions may also be correspondingly exchanged. Alternatively, the contacts records associations may be left in the state extant prior to the drag-and-drop operation. In an exemplary variant of this alternative embodiment, the display update application 107 may provide for a drag-and-drop operation of other data displayed in a vicinity of the positions for manipulation of the contacts records associations with the positions. For example, in response to a drag-and-drop operation of "Shaun" to position 2, the display update application 107 may ultimately switch the contacts records for "Shaun" and "Jerod" in the table 203.

After the user has made a change to the display page representation, the display update application 107 may invoke the content synchronization application 108 to propagate the changes from the server 100 to the handheld device 120 via a communication link. In an example embodiment in which the handheld device 120 is a cellular phone and the server is maintained by a service provider that provides service to the cellular phone 120, this link may include a wireless connection for the handheld device 120 and various other conventional network topologies used by the service provider.

The content synchronization application 108 may use a data transfer protocol, such as Short Messaging Service (SMS) and/or Multimedia Messaging Service (MMS). Such protocols are conventionally used for transfer of text messages, pictures, audio clips, and other multimedia elements. Conventionally, once a message or multimedia element is delivered to a wireless device, a message or flag is issued to alert the user of the device that a new message or multimedia element has been delivered.

In an example embodiment of the present invention, the content synchronization application 108 may send an SMS/MMS message to the handheld device 120 to inform it of the update to the display page made by user interaction with the display page representation of the webpage. The message(s) may be sent immediately in response to a drag-and-drop operation. Alternatively, the message(s) may be sent in response to an instruction by the user to permanently set the changes, as described above.

In an example embodiment of the present invention, the system and method may withhold user alerts alerting the user of the handheld device 120 of the incoming SMS/MMS message(s) received from the content synchronization application 108, since such alerts may be disruptive of the user experience at the handheld device 120 and unnecessary since the updates are made via the website and not via operation of local programs of the handheld device 120. In some situations involving an embodiment of the present invention, alerts acknowledging updates to the display are more appropriate, and thus conducted, via the website than via local programs of the handheld device 120. In an example embodiment, the synchronization occurs "behind the scenes."

Accordingly, in an example embodiment of the present invention, the handheld device 120 may store multiple messaging profiles. If an incoming message matches a first messaging profile, the handheld device 120 may output an alert indicating the presence of a new message. If an incoming message matches a second messaging profile, the handheld device 120 may update a data store in accordance with information of the incoming message and may abstain from outputting a user alert of the message. In an example embodiment of the present invention, the content synchronization application 108 may send an SMS message to the handheld device 120 indicating that an update is to be made. The content synchronization application 108 may send an MMS message following the SMS message and including the substance of the change. The SMS/MMS message may be in accordance with the second messaging profile. Accordingly, upon receipt of the SMS/MMS message, the handheld device 120 may make the appropriate update(s) without outputting an alert message to the user.

The MMS messages sent by the content synchronization application 108 to indicate an update of an association of graphical objects with position numbers may follow a predetermined structure of the second messaging profile. The structure may provide for initially indicating a position number or numbers, then a separator indicating an end of the position number list, and then the files including the graphical objects to be associated with the listed position numbers. If a change to the display page representation via the webpage affects only one of the positions, the MMS message may include an identification of only the single affected position and its corresponding graphical object. If the change to the display page representation via the webpage affects multiple positions, all of the affected positions may be listed, followed by the respective associated graphical object files.

In response to receipt of the MMS message, the processor 102b of the handheld device 120 may update its local table of positions to correspond to the table 203 maintained at the server 100. When the display page for which the display page representation was provided via the website and via which the user of the webpage entered changes regarding the positions of the representation is subsequently displayed on the GUI 122 of the handheld device 120, the processor 102b may generate the display page in accordance with the updated table of the handheld device 120. The display page may therefore appear as, and be synchronized with, the updated display page representation of the webpage. Similarly, the local data store including the table of the handheld device 120 may accordingly be synchronized with the table 203 of the display data store 106.

According to the example embodiment of the present invention in which other updates to the display data store 106 may be made, such as updates to the positions with which contacts records may be associated, the content synchronization application 108 may similarly send other messages structured in a predetermined manner in response to receipt of which the processor 102b of the handheld device 120 may update the local data store to reflect the changes.

Some benefits of some embodiments of the present invention providing for entering changes using the web page and therefore for entering the changes using the remote device 130 rather than at the handheld device 120 include, e.g., a larger view screen, larger input keyboard, and faster hardware. Benefits of a handheld device 120 over stationary devices include its mobility and ability to always be with the user. Aside from providing for changes to the display pages to be made via interaction with webpages of the website maintained at the server 100, an example embodiment of the present invention additionally provides for making similar changes directly using local non-web programs of the handheld device 120. Such changes at the handheld device 120 may be made without receipt of messages from the content synchronization application 108.

For example, a user may select a locally stored icon or picture, e.g., an icon obtained directly from a content provider 110 or a picture taken with a built-in digital camera, for association with one of the positions of the display page of the handheld device 120 using a local program of the handheld device 120. In response to an update of a display page of the handheld device 120 entered using a local program of the handheld device 120, an application on the handheld device 120 may, similar to the content synchronization application 108 of the server 100, send a message to the server 100 informing it of the update. The content synchronization 108 may receive the message from the handheld device 120 and provide the data to the display update application 107 to handle the update of the display data store 106 and/or the vault 105 in accordance with the received message. The message sent by the handheld device 120 to the server 100 may be of the same type of SMS/MMS messages sent by the server 100 to the handheld device 120, as described above.

Synchronization in either direction may be triggered in alternative ways. In an example embodiment of the present invention, the user clicking a "save changes" button or similar button may trigger the display update application 107 or the local program of the handheld device 120 to invoke the synchronization. In an alternative example embodiment of the present invention, synchronization may be invoked in response to each update in the display page representation.

In an example embodiment of the present invention, the website of the server 100 may provide a link to a page of the content provider 110 that includes graphical objects which may be purchased. In response to selection of the link, the display update application 107 may provide a webpage that includes, instead of graphical objects of the vault 105, graphical objects which may be purchased from the content provider 110 and which are provided by the content provider 110 to the server 100 when the link to the content provider 110 is selected. Alternatively, a single group of graphical objects including graphical objects of the vault 105 and the content provider 110 may be displayed. The website may provide for update of the display pages with graphical objects of the content provider 110 via interaction with the webpage displaying the graphical objects of the content provider 110 in a manner similar to that described above with respect to the graphical objects of the vault 105. The user may drag one or more displayed objects of the content provider 110 to corresponding positions of the display page representation 201. If the user selects a "place order" button, the dragged objects occupying positions of the display page representation 201 may be purchased. In response to the purchase, the vault 105 may be updated to include the purchased graphical object(s), the table 203 of the display data store 106 may be updated to indicate an association with the relevant positions with the purchased graphical objects, and a message may be sent by the content synchronization application 108 to the handheld device 120 informing it of the update. According to the embodiment in which graphical objects of the vault 105 and of the content provider 110 may be displayed and manipulated together, a purchase transaction may be associated with the objects of the content provider 110, while an update without a purchase transaction may be associated with the objects of the vault 105. In response to the user input at the remote device 130 indicating an order placement for the objects of the content provider 110, the server 100 may send an order request to the content provider 110. Responsive to the request, the content provider may transmit the requested graphical object(s) to the server 100.

In an alternative example embodiment, the webpage providing the representation of the display page and the graphical objects of the content provider 110 may be generated by the content provider 110. For example, the content provider 110 may include the components described above with respect to the generation by the server 100 of the webpage, e.g., a display data store 106, a content synchronization application 108, and a display update application 107. According to this embodiment, the server 100 may provide a webpage using the vault 105 when a webpage having the graphical objects of the vault 105 is requested and the content provider 110 may provide a webpage using its locally stored graphical objects offered for purchase when a webpage having the graphical objects offered for purchase is requested. This embodiment may provide that a single webpage having both kinds of content, i.e., the vault 105 content and the graphical objects offered for sale would not be provided. The webpage generated by the content provider 110 may be accessed by the remote device 130 (or any device having web access) by entering the website address of the content provider 110. Alternatively, the webpage 110 may be accessed by selecting a link of a first webpage provided by the server 100. In response to the link selection, the web browser may access the website of the content provider 110. An instruction entered at the remote device 130 for purchasing a graphical object or objects placed in a position of the display page representation may be transmitted directly to the content provider 110. The content provider 110 may update balance and billing records and transmit a synchronization message to the handheld device 120 as described above. Responsive to an update made to the data store at either the server 100 or the content provider 110, the entity at which the update had been made may inform the other entity of the update and the account to which the update is to be made so that the data stores of each may be synchronized. While the content provider 110 might not store a copy of the vault 105, the content provider 110 may store copies of those graphical objects that are associated with the positions of the display page representation in its current state. Other synchronization paths may alternatively be implemented between the server 100, content provider 110, and handheld device 120.

According to the embodiment in which the server 100 and content provider 110 provide separate webpages, when an update is entered at the handheld device 120 via a local non-web program of the handheld device 120, the handheld device 120 may transmit a synchronization message to the server 100 and to the content provider 110. Alternatively, the handheld device 120 may transmit the synchronization message to the server 100 which may forward the message to the content provider 110.

In an example embodiment of the present invention, the vault 105 may store digital media modified by Digital Rights Management (DRM) software to protect the media's copyrights, trademarks, or other legal rights. For example, DRM protection may prevent a device which has received the DRM protected object from forwarding the object to another device. According to this embodiment, the content synchronization application 108 may implement a DRM handler 109 to handle DRM algorithms for the synchronization. The DRM handler 109 may implement a DRM protection algorithm to ensure that the graphical object files sent by the content synchronization application 108 using the MMS messages cannot be forwarded by the handheld device 120 to another device after it receives the object.

For example, in an example embodiment of the present invention, in response to a purchase order of a graphical object of the content provider 110 placed via the website of the server 100, the content provider 110 may send an unprotected version of the purchased object to the server 100, since a protected version might prevent the server 100 from forwarding the object to the handheld device 120. The display update application 107 may include an application program interface (API) for interfacing with the content provider 110 to receive the object from the content provider 110. In response to receipt of the object from the content provider 110, the display update application 107 may update the vault 105 and display data store 106. The display update application 107 may invoke the content synchronization application 108 to send the SMS/MMS message to the handheld device 120. Since the object to be sent is a purchased object, the content synchronization application 108 may invoke the DRM handler 109 to run a protection algorithm to apply DRM protection to the purchased object. After receiving the modified object from the DRM handler 109, the content synchronization application 108 may forward the object to the handheld device 120. The modified version may be stored in the vault 105 so that subsequent synchronizations involving the graphical object would not require invoking the DRM handler 109. Alternatively, the DRM handler 109 may be used for each synchronization operation in which the graphical object is included in a synchronization message.

According to either embodiment described above with respect to whether or not a webpage having graphical objects of the content provider 110 is provided by the server 100, the content provider 110 may also be accessed directly by the handheld device 120 (or the remote device 130 according to the embodiment in which the content provider provides a webpage having the display page representation and the graphical objects offered for sale) instead of via the website of the server 100. The graphical object sent by the content provider 110 to the handheld device 120 may be DRM protected. The handheld device 120 may therefore be prevented from forwarding the graphical object file to the server 100 for synchronization with the display data store 106. Accordingly, in an example embodiment of the present invention, in response to a purchase of a graphical object from the content provider 110, the content provider 110 may send a copy of the graphical object file to the handheld device 120 and to the server 100. The handheld device 120 may send a synchronization message to the server 100 which includes an identification of the graphical object file (which the server 100 has received from the content provider 100) instead of the graphical object file itself. Accordingly, when displaying the display page representation, the server 100 may access the identified file for display of the purchased graphical object at its corresponding position. In an example embodiment of the present invention, the copy of the graphical object file sent by the content provider 110 to the server 100 may be without DRM protection. The server 100 may therefore forward the object in synchronization messages sent to the handheld device 120 in response to additional updates made via the website. When preparing the message to be sent to the handheld device 120, the content synchronization application 108 may implement the DRM handler 109 to DRM protect the graphical object. Alternatively, the server 100 may trigger the DRM handler 109 to add DRM protection to the object as soon as it is received from the content provider 110, i.e., prior to synchronization message generation by the content synchronization application 108. Accordingly, even if the user modifies the display page of the handheld device so that the purchased object is no longer used, should the user decide to reuse the object, the user may obtain the object from the vault 105.

In an alternative embodiment of the present invention, in response to a direct access of the content provider 110 by the handheld device 120 for the purchase of a graphical object, the content provider may send a single copy of the object to the server 100, which may, in turn, send a message to the handheld device 120 including the object file with DRM protection. However, an embodiment in which the content provider 110 sends a copy to both the server 100 and the handheld device 120 may be preferable since the handheld device 120 may be configured to refrain from outputting an alert acknowledging that the new content has been received if the content is received at the handheld device 120 via the SMS/MMS message from the server 100, as described above.

An alert, however, may be desirable if the change is made using the handheld device 120 to directly access the content provider 110.

Figure 3A:
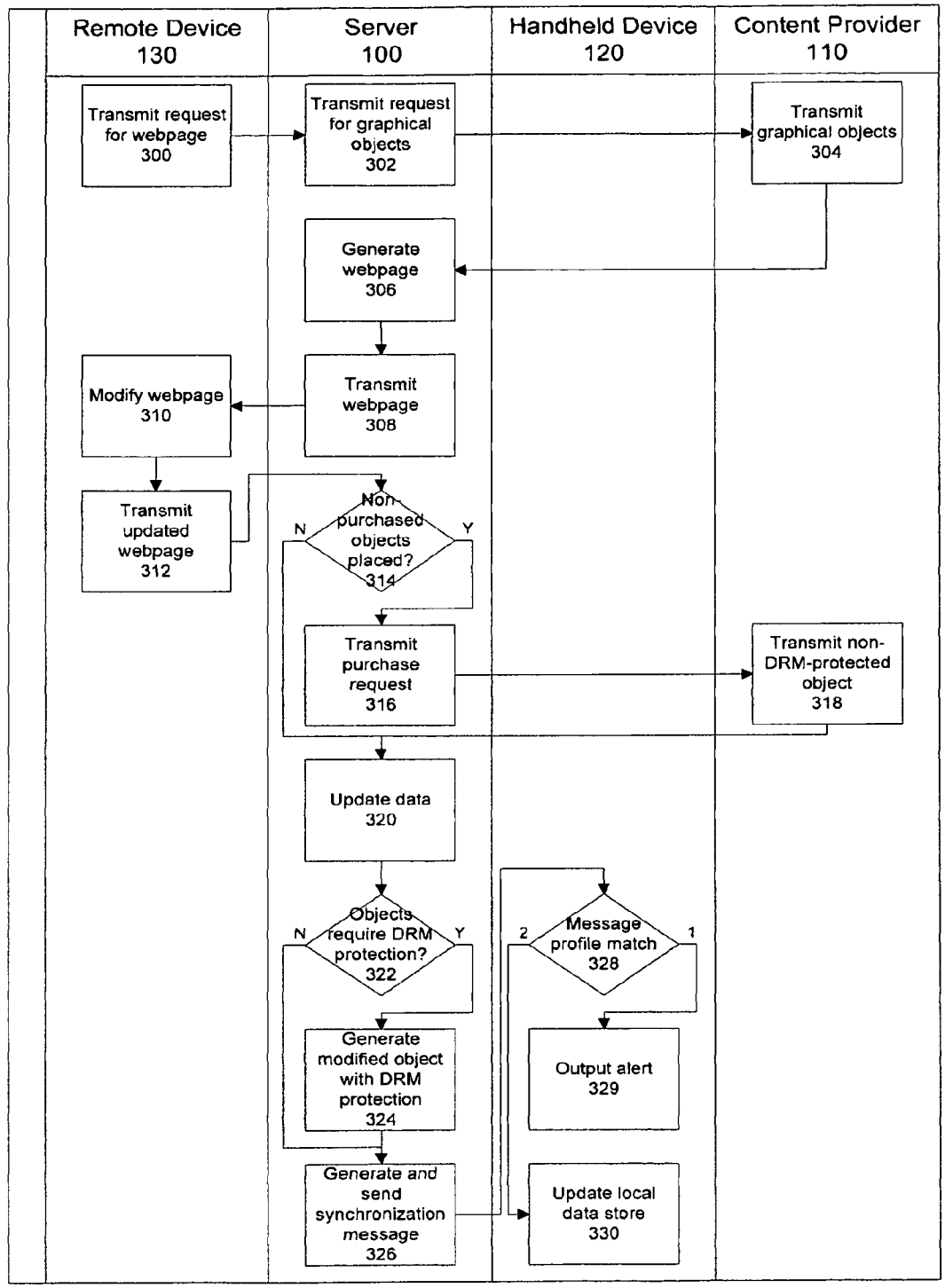
FIGS. 3a and 3b are flowcharts illustrating a method of remotely updating a display page of a handheld device, according to example embodiments of the present invention.

FIG. 3A is a flowchart that illustrates a method of remotely updating a display page of the handheld device 120 via a webpage provided by the server 100 according to an example embodiment of the present invention. At 300, in response to user input, the remote device 130 may transmit a request for a webpage to the server 100. For example, the request may include entering an Internet Protocol (IP) address, receiving a log-in page, entering account information, e.g., regarding an account of a cellular service provided by the server operating entity to the handheld device 120, and navigating towards a desired page, e.g., a page replicating at least a portion of a display page of the handheld device 120 including defined positions reserved for association with contacts records and providing functionality for modification of the portion of the display page. At the end of the navigation, the remote device 120 may transmit a page specific request for the display page replication to the server 100.

Responsive to receipt of request, the server 100 may, at 302, transmit a request to the content provider 110 for graphical objects, e.g., offered for sale by the content provider 110, for inclusion in the requested webpage. Alternatively the server 100 may incorporate into the webpage graphical objects previously received from the content provider 110 that have been locally stored at the server 100. In an example embodiment, whether the server 100 requests graphical objects from the content provider 100 may depend on whether the webpage request specifies a request for objects from the content provider 110. At 304, the content provider 110 may transmit graphical objects to the server 100. The graphical objects may include an overlay such as "sample" before the graphical objects are purchased.

At 306, the server 100 may generate the requested webpage. For the generation of the webpage, the server 100 may access the display data store 106 to determine user settings regarding the display of the display page at the handheld device 120, including which contacts records and graphical objects are associated with respective ones of the defined positions of the display page. Based on the determined user settings, the server 100 may generate a first section of the webpage including the display page replication. The replicated section may include the defined positions populated with their associated graphical objects. While the set of defined positions may be reserved for association with contacts records, one or more of the positions might not yet have been associated with a contacts record, in which case the position may be populated with an indicator of its availability for such an association. Further, while the positions may be associable by the user with graphical objects, one or more of the positions might not yet have been associated by the user with a graphical object, in which case a default graphical object may populate the position. Instead of the availability indicator and/or the default graphical object, a screen background or text object may be used at the unassigned and/or unpopulated positions. The server 100 may also generate a second section of the requested page including selectable graphical objects of the vault 105 and/or received from the content provider 110. The server 100 may include in the webpage animation functionality, e.g., for rotating the defined positions and/or carrying out a drag-and-drop operation. For example, the webpage may include Flash and/or Asynchronous JavaScript and XML (Ajax) code or other animation friendly code. At 308, the server 100 may transmit the generated webpage to the remote device 130.

At 310, in accordance with user input, the remote device 130 may modify the first section of the webpage, e.g., by exchanging graphical objects and/or contacts records between positions, and/or by dragging one or more graphical objects from the second section of the webpage to one or more of the positions of the first section. In response to the modification or in response to user input of an instruction to set the modification in the display page, the remote device 130 may, at 312, transmit the updated version of the webpage or of the first section of the webpage to the server 100.

Upon receiving the updated data, the server 100 may, at 314, determine whether any graphical objects of the content provider 110 that has not yet been purchased has been placed at any of the positions of the first section. If such an object has been placed in a position, the server 100 may, at 316, transmit a purchase request to the content provider 110. Responsive to the request, the content provider 110 may, at 318, transmit a non-DRM-protected version of the requested object(s) to the server 100. After receiving the graphical object(s), the server 100 may proceed to 320. If a graphical object of the content provider 110 that has not been previously purchased has not been placed in any of the positions, the server may proceed from 314 to 320.

At 320, the server 100 may update the vault 105 to include newly obtained graphical objects that did not previously populate the vault 105, if any. The server 100 may further update the display data store 106 to reflect any changes to the association of positions to contacts records and/or graphical objects.

At 322, the server 100 may determine whether any of the objects associated with positions of the display page require DRM protection. If any object requires DRM protection, the server 100 may, at 324, generate a modified version of the object including DRM protection. Otherwise, the server 100 may proceed to 326. Also, after performance of the generation of the modified version at 324, the server 100 may proceed to 326.

At 326, the server 100 may generate and send a synchronization message including a list of modified positions and the graphical object files with which the listed positions are to be associated and with the graphical objects of which the positions are to be populated in the display page of the handheld device 120. If changes in the associations between positions and contacts records have been made, the server 100 may include in the synchronization message an indication of the contacts records with which the listed positions are to be associated.

At 328, the handheld device 120 may determine whether the received message matches a first stored message profile or a second stored message profile. If the handheld device 120 determines that the received message matches a first stored message profile, the handheld device may, at 329, output an alert indicating receipt of a new message. Otherwise, the handheld device 120 may, at 330, update a local data store of graphical objects and/or of data identifying associations between the positions of the display page and their respective graphical objects and/or their respective contacts records.

Figure 3B:
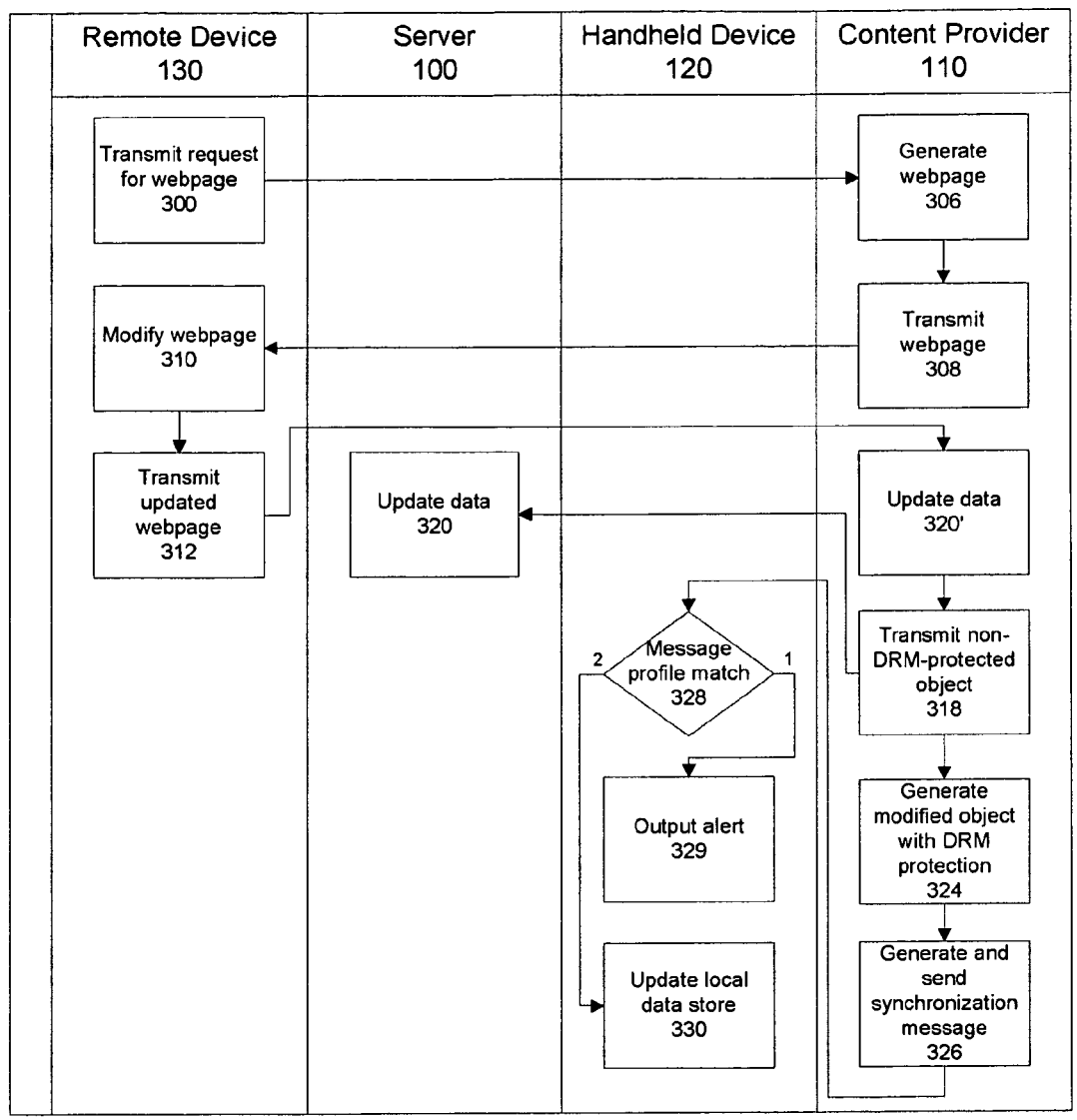

FIG. 3B is a flowchart that illustrates a method of remotely updating a display page of the handheld device 120 via a webpage provided by the content provider 110 according to an example embodiment of the present invention. The request at 300 may be to the content provider 100 for a webpage in which graphical objects offered for sale by the content provider or representations thereof, e.g., having an overlay, are included. Steps 306 and 308 may be performed by the content provider 110. The updated webpage, including a purchase request, may be transmitted by the remote device 130 to the content provider 110 at 3 12. The content provider 110 may update its data accordingly at 320' and may, at 318, transmit the non-DRM-protected object along with the other update data, including the new position-object associations to the server 100 for the server 100 to update its data at 320. The content provider 110 may perform 324 and 326. In response to receipt of the synchronization message sent at 326, the handheld device may perform 328 and 330.

Figure 4:
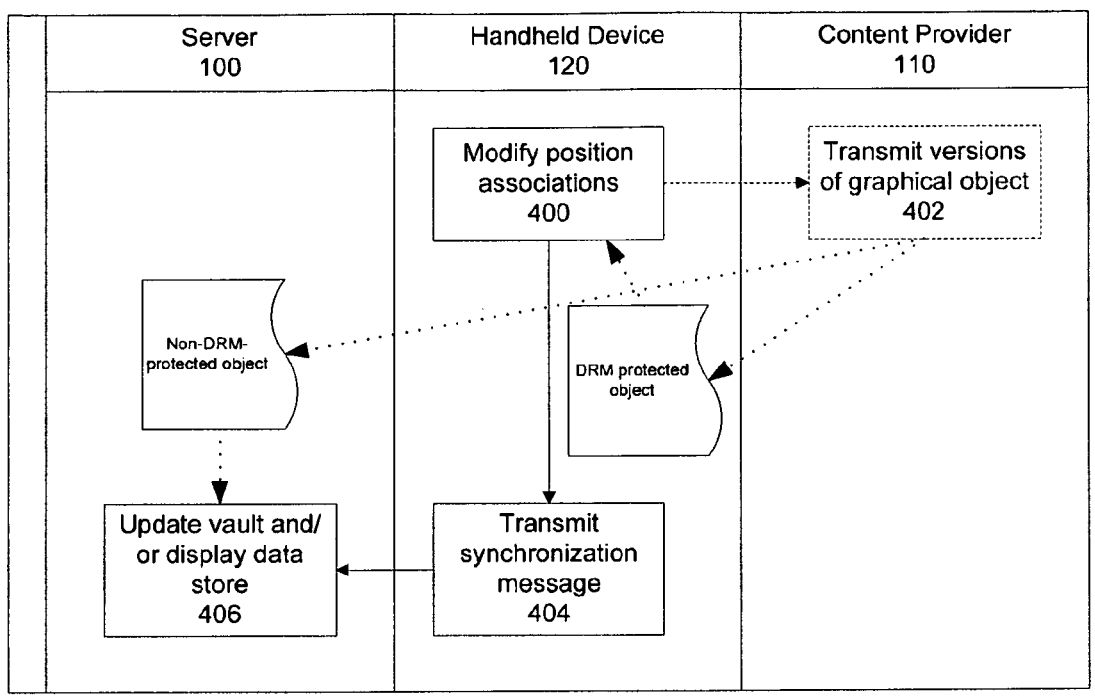
FIG. 4 is a flowchart illustrating a method of updating a display data store of a server based on changes to a display page of a handheld device, according to an example embodiment of the present invention.

FIG. 4 is a flowchart that illustrates a method of updating the display data store 106 of the server 100 based on changes to a display page of the handheld device 120 made using a local program of the handheld device 120, according to an example embodiment of the present invention.

At 400, the handheld device 120 may modify an association of positions of the display page with contacts records or graphical objects that populate the positions. The change may include purchasing a graphical object from the content provider 110. The purchase is represented by the dashed lines in FIG. 4. A purchase request for a graphical object may be sent to the content provider 110. At 402, the content provider may transmit a DRM protected version of the requested graphical object to the handheld device 120 and a non-DRM-protected version of the requested graphical object to the server 100.

In response to the change or in response to a user instruction to set the changes, the handheld device 120 may, at 404, send a synchronization message to the server 100. The synchronization message may include a list of modified positions and the names of the graphical object files with which the listed positions are to be associated and with the graphical objects of which the positions are to be populated in the display page of the handheld device 120 (and its replication in the webpage generated by the server 100). If changes in the associations between positions and contacts records have been made, the handheld device 120 may include in the synchronization message an indication of the contacts records with which the listed positions are to be associated.

The server 100 may, at 406, update the vault 105 and the display data store 106. For those positions that have been associated at the handheld device 120 with newly purchased graphical objects, if any, the server 100 may update the display data store 106 to include an association of the positions with the non-DRM-protected files received from the content provider 110 and identified in the synchronization message received from the handheld device 110.

Those skilled in the art can appreciate from the foregoing description that the present invention may be implemented in a variety of forms, including, for example, variations of the sequence of the steps shown in FIGS. 3A, 3B and 4, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A system for updating display pages of a handheld device, comprising:
    a first server configured to maintain a website;
    a first device configured to access the first server; and
    a second device configured to display a display page having a set of defined positions;
    wherein:
        in response to the access by the first device, the first server transmits to the first device a webpage including a first section having a representation of the display page that visually appears as at least a portion of the display page including the set of defined positions and a second section having a plurality of graphical objects;
        the first device:
            displays the webpage;
            receives user input interpreted as an interaction with the webpage to update the display page representation to include at one of the defined positions a selected one of the graphical objects; and
            transmits to the first server data indicating that the update is to be applied to the display page;
        responsive to receipt of the data transmitted to the first server, the first server:
            updates a positions-objects association such that the updated positions-objects association associates the one of the defined positions with the selected graphical object; and
            transmits a synchronization message to the second device identifying the association of the one of the defined positions with the selected graphical object; and
        the second device displays, in accordance with the synchronization message, an updated version of the display page including the selected graphical object at the one of the defined positions.

2. The system of claim 1, wherein:
    the plurality of graphical objects of the second portion includes graphical objects offered for sale by a content provider;
    responsive to receipt of the data transmitted to the first server, the first server sends a purchase request to the content provider for the selected graphical object; and
    the first server receives a copy of the selected graphical object from the content provider.

3. The system of claim 2, wherein the copy is sent by the content provider without Digital Rights Management (DRM) protection to the first server, the first server modifies the copy to include the DRM protection, and the identification of the association of the one of the defined positions with the selected graphical object in the synchronization message includes the modified copy.

4. The system of claim 1, wherein the data is transmitted to the first server in response to a user input instruction to update the display page to appear as the updated display page representation.

5. The system of claim 1, wherein the synchronization message includes at least one of a Short Messaging Service (SMS) and a Multimedia Messaging service (MMS) message.

6. The system of claim 5, wherein:
    the second device:
        stores a first MMS profile and a second MMS profile, the synchronization message including an MMS message that is in accordance with the second MMS profile; and
        outputs an alert responsive to receipt of a message that is in accordance with the first MMS profile and not in response to receipt of any message that is in accordance with the second MMS profile; and
    the display of the updated version of the display page by the second device occurs without any user interaction with the second device.

7. The system of claim 5, wherein:
    the plurality of graphical objects of the second portion includes graphical objects offered for sale by a content provider; responsive to receipt of the data transmitted to the first server, the first server sends a purchase request to the content provider for the selected graphical object; the first server receives a copy of the selected graphical object from the content provider, and wherein the copy is sent by the content provider without Digital Rights Management (DRM) protection to the first server, the first server modifies the copy to include the DRM protection, and the identification of the association of the one of the defined positions with the selected graphical object in the synchronization message includes the modified copy.

8. The system of claim 1, wherein:

each of the set of defined positions is reserved for association with a corresponding contacts record; and the display page of the second device includes functionality such that responsive to selection of the selected graphical object in the one of the defined positions of the updated version of the display page, the second device one of displays the contacts record corresponding to the one of the defined positions and initiates a communication in accordance with at least one communication listing of the corresponding contacts record.

9. The system of claim 1, wherein:

responsive to user input entered at the second device for updating the display page to include at the one of the defined positions a second graphical object, the second device transmits a synchronization message to the first server identifying the association of the one of the defined positions with the second graphical object; and responsive to receipt of the synchronization message transmitted by the second device, the first server updates a positions-objects association.

10. The system of claim 9, wherein:

the updating the display page to include at the one of the defined positions the second graphical object includes the second device transmitting a request to a content provider to purchase the second graphical object;

responsive to the request, the content provider transmits a version of the second graphical object having Digital Rights Management (DRM) protection to the second device and a version of the second graphical object without the DRM protection to the first server; and the identification of the association of the one of the defined positions with the second graphical object identifies the version of the second graphical object transmitted by the content provider to the first server.

11. The system of claim 1, wherein the interaction includes a drag-and-drop operation of the selected graphical object from the second section to the one of the defined positions in the first section.

12. The system of claim 1, wherein the second device is a cellular telephone.

13. The system of claim 12, wherein the first server and the website are maintained by a provider of cellular service to the cellular telephone.

14. The system of claim 1, wherein:

the plurality of graphical objects of the second portion includes graphical objects offered for sale;

responsive to receipt of the data transmitted to the first server, the first server:

sends a copy of the selected graphical object without Digital Rights Management (DRM) protection to a second server; and generates a copy of the selected graphical object including the DRM protection; and the synchronization message includes the copy including the DRM protection.

15. A method for updating display pages of a handheld device, comprising:

responsive to access of a first server by a first device, the first server transmitting to the first device a webpage that includes a first section having a representation of a display page that a second device is configured to display, the display page having a set of defined positions, and that includes a second section having a plurality of graphical objects, wherein the representation of the display page visually appears as at least a portion of the display page including the set of defined positions;

the first device:

displaying the webpage;

receiving user input interpreted as an interaction with the webpage to update the display page representation to include at one of the defined positions a selected one of the graphical objects; and transmitting to the first server data indicating that the update is to be applied to the display page;

responsive to receipt of the data transmitted to the first server, the first server:

updating a positions-objects association such that the updated positions-objects association associates the one of the defined positions with the selected graphical object; and transmitting a synchronization message to the second device identifying the association of the one of the defined positions with the selected graphical object; and the second device displaying, in accordance with the synchronization message, an updated version of the display page including the selected graphical object at the one of the defined positions.

16. The method of claim 15, wherein the plurality of graphical objects of the second portion includes graphical objects offered for sale by a content provider, the method further comprising:

responsive to receipt of the data transmitted to the first server, the first server sending a purchase request to the content provider for the selected graphical object; and the first server receiving a copy of the selected graphical object from the content provider.

17. The method of claim 16, wherein the copy is sent by the content provider without Digital Rights Management (DRM) protection to the first server, the method further comprising:

the first server modifying the copy to include the DRM protection, the association of the one of the defined positions with the selected graphical object in the synchronization message including the modified copy.

18. The method of claim 15, wherein the data is transmitted to the first server in response to a user input instruction to update the display page to appear as the updated display page representation.

19. The method of claim 15, wherein the synchronization message includes at least one of a Short Messaging Service (SMS) and a Multimedia Messaging service (MMS) message.

20. The method of claim 19, further comprising:

the second device:

storing a first MMS profile and a second MMS profile, the synchronization message including an MMS message that is in accordance with the second MMS profile; and outputting an alert responsive to receipt of a message that is in accordance with the first MMS profile and not in response to receipt of any message that is in accordance with the second MMS profile.

21. The method of claim 15, wherein:

each of the set of defined positions is reserved for association with a corresponding contacts record; and the display page of the second device includes functionality such that responsive to selection of the selected graphical object in the one of the defined positions of the updated version of the display page, the second device one of displays the contacts record corresponding to the one of the defined positions and initiates a communication in accordance with at least one communication listing of the corresponding contacts record.

22. The method of claim 15, further comprising:

responsive to user input entered at the second device for updating the display page to include at the one of the defined positions a second graphical object, the second device transmitting a synchronization message to the first server identifying the association of the one of the defined positions with the second graphical object; and responsive to receipt of the synchronization message transmitted by the second device, the first server updating a positions-objects association.

23. The method of claim 22, further comprising:

responsive to the user input entered at the second device for updating the display page, the second device transmitting a request to a content provider to purchase the second graphical object;

the second device receiving from the content provider a version of the second graphical object having Digital Rights Management (DRM) protection and that was transmitted to the second device by the content provider in response to the request; and the first server receiving from the content provider a version of the second graphical object without the DRM protection that was transmitted to the first server by the content provider in response to the request;

wherein the identification of the association of the one of the defined positions with the second graphical object of the synchronization message transmitted by the second device identifies the version of the second graphical object received by the first server from the content provider.

24. The method of claim 15, wherein the interaction includes a drag-and-drop operation of the selected graphical object from the second section to the one of the defined positions in the first section.

* * * * *